United States Patent [19]

Jensen et al.

[11] Patent Number: 4,818,543
[45] Date of Patent: Apr. 4, 1989

[54] CONTROL OF FOOD INTAKE IN POULTRY BY DIETARY ADDITION

[75] Inventors: Leo S. Jensen, Athens, Ga.; Bryan I. Fancher, Spofford, N.H.

[73] Assignee: University of Georgia Research Foundation, Inc., Athens, Ga.

[21] Appl. No.: 109,259

[22] Filed: Oct. 15, 1987

[51] Int. Cl.$^4$ ............................................... A23K 1/00
[52] U.S. Cl. ..................................... 426/2; 426/623; 426/630; 426/807
[58] Field of Search ..................... 426/2, 74, 623, 630, 426/636, 601, 807; 514/557, 578

[56] References Cited

U.S. PATENT DOCUMENTS

| | | | |
|---|---|---|---|
| 2,745,745 | 5/1956 | Blake et al. | 99/4 |
| 2,878,124 | 3/1959 | Krackerberg | 99/4 |
| 3,001,874 | 9/1961 | Wineman | 99/4 |
| 3,085,929 | 4/1963 | Haslam | 167/22 |
| 3,219,453 | 11/1965 | Bogdonoff et al. | 99/4 |
| 3,295,983 | 1/1967 | Kato et al. | 99/2 |
| 3,522,353 | 7/1970 | Marco et al. | 424/317 |
| 3,564,098 | 2/1971 | Erwin et al. | 424/317 |
| 3,669,676 | 6/1972 | Karr et al. | 426/807 |
| 4,158,057 | 6/1979 | Stanko | 424/252 |
| 4,197,319 | 4/1980 | Betz et al. | 426/807 |
| 4,234,604 | 11/1980 | Betz et al. | 426/807 |
| 4,311,713 | 1/1982 | Betz et al. | 426/2 |
| 4,351,835 | 9/1982 | Stanko | 424/252 |
| 4,497,798 | 2/1985 | Lambert | 424/153 |
| 4,548,937 | 10/1985 | Stanko | 514/251 |

FOREIGN PATENT DOCUMENTS 52-50881 4/1977 Japan .

OTHER PUBLICATIONS

The Merck Index Eighth Edition Published by Merck & Co. (1968) pp. 501.
Cave, "Effect of Dietary Short-and Medium Chain Fatty Acids on Feed Intake by Chicks", *Poultry Sci.*, 61: 1147–1153 (1982).
Cave, "Glycine-and Fatty Acid-Induced Restriction of Food Intake", *Poultry Sci.*, 62: 125–132 (1982);
Cave, "Use of Dietary Ammonium Sulphate In Control of Growth Rate of Broiler Breeder Replacement Pullets from One Day of Age", *Poultry Sci.*, 61:1859–1865.
Cave, "Effect of Dietary Glycine on Feed Intake and Growth of Meat-and Egg-Strain Chicks", *Poultry Sci.*, 57: 1605–1608 (1978);
Renner et al., "Utilization of Fatty Acids of the Chicken", *J. Nutr.*, 74: 259–264 (1961);
National Research Council Nutrient Requirements of Poultry, 8th ed., Washington, D.C., National Academy of Sciences—National Research Council, Ch. 3, 11–15 (1984).

*Primary Examiner*—R. B. Penland
*Attorney, Agent, or Firm*—Curtis, Morris & Safford

[57] ABSTRACT

The present invention provides a method and composition for reducing food intake in poultry, particularly chickens, by the dietary addition of glycolic acid.

10 Claims, 3 Drawing Sheets

CONTROL OF FOOD INTAKE IN POULTRY BY DIETARY ADDITION

FIELD OF THE INVENTION

This invention relates to controlling food intake in poultry by dietary addition, and more particularly to a method and composition for reducing food intake in chickens by the dietary addition of glycolic acid.

BACKGROUND OF THE INVENTION

Food intake control is practiced in the commercial production of poultry and other animals under various circumstances. In particular, reducing the food intake of chickens is very important. For example, in the rearing of broiler breeder replacement pullets and roosters, it is essential that food intake be controlled in order to prevent obesity which would result in reduced reproductive performance.

Currently, a common method of accomplishing food intake control in broiler breeder chickens is through a "skip-a-day" program in which the birds are fasted every other day. Also, at the end of the first laying cycle, commercial laying hens are commonly forced molted by removal of food and water for a period of time. Force molting causes laying hens to enter a second egg-laying cycle, thereby increasing the egg output of the birds. Although such fasting procedures are effective for both the rearing of broiler breeders and for forced molting of commercial laying hens, animal welfare groups have complained that these fasting procedures for controlling food intake in poultry are inhumane.

In addition, interest has recently developed in the possible physical restriction of feed intake in broilers during the early stages of life followed by ad libitum feeding. This procedure has been reported as resulting compensatory growth and increased efficiency of meat production. However, physical restriction of feed under commercial broiler production conditions would be difficult to manage and accomplish since such restriction often requires substantial labor or mechanization.

In the area of egg productivity of chickens, Japanese Patent 52-50881 discloses that lower fatty acids, such as formic, acetic, propionic and butyric acids, increase a chicken's egg productivity and reduce a chicken's feed intake ratio. Feed intake ratio is defined as the ratio of weight of feed intake to unit weight of eggs. However, the Japanese patent does not specifically disclose that the actual amount of feed intake is reduced, but only that the ratio of feed intake per egg productivity is reduced.

Nevertheless, control of food intake in chickens has been effected by the dietary addition of certain organic chemicals. For example, a 3% supplementary level of the amino acid glycine is known to reduce food intake of broiler chicks 1-21 days of age by approximately 17%-20%. Cave, Effect of Dietary Glycine on Feed Intake and Growth of Meat- and Egg-Strain Chicks", *Poultry Sci.*, 57: 1605-1608 (1978); Cave, "Glycine- and Fatty-Acid Induced Restriction of Food Intake", *Poultry Sci.*, 62: 125-132 (1982). However, food intake reduction greater than 17%-20% is desirable. Moreover, excessive dietary glycine is known to be ineffective in reducing food intake of chicks beyond 28 days of age. Ibid.

In addition, in diets containing 3% corn oil, complete replacement of the corn oil with propionic, caprylic, capric or lauric acids for corn oil reduced food intake of broiler chickens at 7-21 days of age, but at a maximum food intake reduction of only 11%. Cave, "Effect of Dietary Short- and Medium-Chain Fatty Acids on Feed Intake by Chicks", *Poultry Sci.*, 61: 1147-1153 (1982). At the highest level of dietary supplementation (10%), caprylic acid reduced 9-29 day food intake by about 37% while lauric acid decreased food intake by 48%. Ibid. Dietary lauric acid supplementation (20% of the diet) caused complete feed refusal in some laying hens and had an irritating effect on at least part of the gastrointestinal tract in young chicks. Renner et al., "Utilization of Fatty Acids by The Chicken", *J. Nutr.*, 74: 259-264 (1961).

Further, 0-42 days of age broiler chicks fed a diet supplemented with ammonium sulphate at 1.38% showed reduced food intake by about 7%. Cave, "Use of Dietary Ammonium Sulphate in Control of Growth Rate of Broiler Breeder Replacement Pullets From One Day of Age", *Poultry Sci.*, 61: 1859-1865 (1982). Moreover, a dietary level of 2.75% ammonium sulphate reduced broiler chick food intake at the 0-28 and 42 day age periods by approximately 27% and 22% respectively. Ibid.

Therefore, the methods of dietary addition used in the past are unsatisfactory because the amount of food intake reduction is not sufficient at dietary levels of 3% or less. In addition, at higher levels of dietary addition, there are, in some cases, complete feed refusal or irritation and deleterious physical effects.

It can thus be readily appreciated that provision of a method for controlling food intake in poultry, particularly chickens, which method provides a high level of food intake reduction in poultry with a low level of dietary addition, and eliminates the previously discussed problems, would be a highly desirable advance over the current state of the art in food intake control.

OBJECTS, FEATURES AND ADVANTAGES OF THE INVENTION

It is therefore a general object of the present invention to provide a method for controlling food intake in poultry, particularly chickens, by dietary addition.

It is a further object of the present invention to achieve a high level of food intake reduction in poultry with a low level of dietary addition.

It is another object of the present invention to effect a high level of food intake reduction in poultry, particularly chickens, by low level dietary addition without complete food refusal and without irritation or deleterious physical side effects.

It is yet another object of the present invention to provide a humane method for controlling food intake in poultry, particularly chickens.

It is another object of the present invention to provide a method for controlling food intake in poultry, particularly chickens, without physically restricting the birds.

It is yet another object of the present invention to provide a feed composition which induces reduced food intake in poultry, particularly chickens.

It is a feature of the present invention to treat a poultry feed material with glycolic acid.

It is an advantage of the present invention that when poultry, particularly chickens, are fed with a feed material treated with a low level of glycolic acid, a high level of food intake control will be achieved simply, inexpensively, humanely, and without irritation or deleterious side effects.

These and other objects, advantages and features of the present invention will become more readily apparent after consideration of the following.

SUMMARY OF THE INVENTION

In one aspect, the present invention is directed to a method of controlling food intake in poultry by feeding to the poultry a feed composition containing a feed material and glycolic acid in an amount effective to reduce the intake of the feed material by the poultry.

In another of its aspects, the present invention is directed to a feed composition containing a feed material and glycolic acid in an amount effective to reduce the intake of the feed material by the poultry.

In particular, the method and composition of the present invention are advantageously used to control the food intake of chickens. According to the present invention, glycolic acid is used in an amountof 0.5% to 5%, preferably 2% to 3%, most preferably 2.77%, by weight of the feed composition.

Numerous advantages accrue with the practice of the present invention. The present invention provides a method and composition for controlling food intake in poultry, particularly chivckens, without fasting or physical restriction of the animals. In addition, glycolic acid is a readily available, inexpensive, organic chemical which is easily applied to a wide variety of feed materials. Accordingly, the present invention allows feed intake control which is effective, simple, inexpensive and humane.

BRIEF DESCRIPTION OF THE DRAWINGS

The present invention, as well as other objects and features thereof, will be understood more clearly and fully from the following description of certain preferred embodiments, when read with reference to the accompanying drawings, in which.

DETAILED DESCRIPTION OF THE INVENTION

The present invention relates to a method for controlling food intake in poultry. In particular, the method is effective for controlling food intake in chickens, for example, broilers. In accordance with the method, a suitable feed material is treated with glycolic acid in an amount effective to reduce the intake of the feed material in the broiler. Suitable poultry feed includes a variety of commercially available feed as well as feed mixed in situ. Typically, a suitable feed material may contain ground yellow corn, soy bean meal, poultry fat and a number of amino acids, vitamins, minerals and additional dietary additives.

Glycolic acid, also referred to as glycolate, hydroxyacetic acid and hydroxyethanoic acid, is a naturally occurring compound and is found in a number of foods including fruits, vegetables and beverages derived from plant sources. It is an inexpensive organic acid and is used extensively in the chemical and textile industries. For example, it is used in the processing of textiles, leather and metals; in pH control and wherever an inexpensive organic acid is needed. Glycolic acid is readily available from a number of commercial sources including Aldrich Chemical Co. and the Eastman Kodak Co.

At room temperature, glycolic acid exists as a granular, crystalline material and is advantageously applied to the feed either in its crystalline form or in an aqueous solution, such as a 70 percent aqueous solution. The feed composition contains glycolic acid in an amount effective to reduce the intake of the feed material by the poultry. The effective amount of glycolic acid ranges from 0.5 to 5%, preferably 2 to 3% by weight of the feed composition. The most preferred amount is 2.77% by weight of the feed composition.

If the glycolic acid is used in its crystalline form, the feed composition is prepared by blending the crystalline glycolic acid with the feed material via means known to one of ordinary skill in the art. For example, the desired amount of glycolic acid is weighed out and added to the basal feed which has been previously mixed. The feed with the added glycolic acid is then mixed for at least ten minutes in either a stainless steel type mixer with a paddle or in a horizontal type mixer depending on the amount of feed to be mixed. This mixing procedure is similar to known procedures by which other ingredients such as vitamin and mineral premixes are added to a basal feed to be fed to an animal.

If an aqueous solution of glycolic acid is used, the feed is treated by blending the glycolic acid solution with the feed material followed by drying. For example, the desired amount of the aqueous concentrate is weighed out and blended by hand with a small quantity of the basal feed. The resulting blend is then added to the rest of the basal diet and mixed in a mechanical mixer for at least ten minutes.

Further objects, features and advantages of this invention will be apparent from the following examples.

Example 1

The effects of feeding a lower protein diet supplemented with glutamic acid (GLU), glycine (GLY), glycolic acid (GA), or glyoxylic acid (GLYO) on body weight gain, food intake, food efficiency and abdominal fat deposition were determined. Broiler chicks, of both sexes, obtained from a commercial hatchery were mixed. The period during which the chicks were fed the supplemented diet was 21-42 days of age (d). Prior to 21 d, the chicks were reared conventionally in floor pens under continuous illumination. At 21 d, the chicks were randomly assigned to groups of ten, wing-banded, weighed by group and randomly assigned to three pens per supplemented diet. Each pen was equipped with one tube-type feeder and one adjustable automatic waterer. At 42 d, all chicks were killed by cervical dislocation, individually weighed and the abdominal fat pad was removed and weighed from five randomly selected chicks per pen. The adipose tissue considered as the abdominal fat pad was that surrounding the gizzard and intestines, extending within the ischium and surrounding the cloaca, bursa of Fabricius and adjacent abdominal muscles. Food intake and mortality were recorded for each pen. The diet was formulated to be adequate in all nutrients as recommended by the National Research Counsel Nutrient Requirements of Poultry, 8th ed., Washington, D.C., National Acadamy of Sciences-National Research Council. Reformulation of the diet was performed as necessary, when supplementing the compounds investigated, to maintain adequate dietary nutrient density. The composition of diets fed appears in Table 1. Dietary supplementation of GLU or GLY was made to increase the dietary amino nitrogen level equivalent to 21% protein. The chemical form of the GA was a crystalline free acid (95% GA), while the GLYO was solubolized in water (50% GLYO).

cantly reduced body weight gain, food intake, feed efficiency, and abdominal fat deposition in comparison to unsupplemented diets. Table 2 also demonstrates that GA was much more effective in reducing food intake then glyoxylic acid.

TABLE 2

Effect of dietary glycine, glutamic, glycolic and glyoxylic acids on 21–42 day female broiler performance (Example 1)

| Diet | Crude protein content g/kg | 42 d Weight g/chick | 21–42 d Weight gain g/chick | 21–42 d Food intake g/chick | 21–42 d Feed efficiency gain:feed | 42 d Abdominal fat deposition % whole carcass | 21–42 d Mortality deaths/number started |
|---|---|---|---|---|---|---|---|
| Control | 210 | 1528 ± 19 | 946 ± 14 | 1920 ± 43 | .491 ± .001 | 2.10 ± .13 | 1/40 |
| Low protein | 180 | 1527 ± 22 | 921 ± 16 | 1900 ± 22 | 485 ± .004 | 2.10 ± .12 | 2/40 |
| 5.35% GLU | 210 | 1505 ± 16 | 905 ± 12 | 1861 ± 25 | .486 ± .003 | 1.78 ± .09 | 1/40 |
| 2.64% GLY | 210 | 1488 ± 14 | 892 ± 11 | 1788 ± 33 | .499 ± .007 | 2.07 ± .08 | 0/40 |
| 2.65% Glycolic acid | 180 | 992 ± 41 | 382 ± 38 | 993 ± 77 | .400 ± .051 | 1.81 ± .12 | 2/40 |
| 2.58% Glyoxylic acid | 180 | 981 ± 21 | 373 ± 19 | 1330 ± 27 | .280 ± .014 | 1.72 ± .11 | 0/40 |

TABLE 1

Composition of the diets fed in Example 1 (g/kg)

| | Control | Low protein | 5.35% GLU | 2.64% GLY | 2.65% GA | 2.58% GLYO |
|---|---|---|---|---|---|---|
| Ground yellow corn USA | 571.8 | 662.7 | 593.2 | 618.7 | 618.7 | 618.7 |
| Soybean oil meal USA (dehulled) | 334.7 | 256.4 | 265.1 | 263.0 | 263.0 | 263.0 |
| Poultry fat (stabilized) | 56.3 | 42.1 | 49.3 | 53.1 | — | — |
| L-glutamic acid (GLU) | — | — | 53.5 | — | — | — |
| Glycine (GLY) | — | — | — | 26.4 | — | — |
| Glycolic acid (GA) | — | — | — | — | 26.5 | — |
| Glyoxylic acid (GLYO) | — | — | — | — | — | 25.8 |
| Dicalcium phosphate (feed grade) | 14.6 | 15.1 | 15.4 | 15.3 | 15.3 | 15.3 |
| Ground limestone | 13.0 | 13.2 | 13.0 | 13.1 | 13.1 | 13.1 |
| Iodized sodium chloride | 4.3 | 4.3 | 4.3 | 4.3 | 4.3 | 4.3 |
| Vitamin premix[1] | 2.5 | 2.5 | 2.5 | 2.5 | 2.5 | 2.5 |
| DL-methionine | 0.1 | 0.9 | 1.0 | 0.9 | 0.9 | 0.9 |
| Trace mineral premix[2] | 0.5 | 0.5 | 0.5 | 0.5 | 0.5 | 0.5 |
| Selenium premix[3] | 0.5 | 0.5 | 0.5 | 0.5 | 0.5 | 0.5 |
| L-lysine.HCL | — | — | — | — | — | — |
| Coban-45[4] | 1.2 | 1.2 | 1.2 | 1.2 | 1.2 | 1.2 |
| BMD-50[5] | 0.5 | 0.5 | 0.5 | 0.5 | 0.5 | 0.5 |
| Calculated content Metabolizable energy (kcal/kg) | 3200 | 3200 | 3200 | 3200 | 3200 | 3200 |
| Crude protein (g/kg) | 210 | 180 | 210 | 210 | 210 | 210 |

[1]Vitamin premix supplies (milligrams/kilogram diet, except as noted): all-trans-retinyl acetate, 5500 IU; cholecalciferol 880 ICU; all-rac-α-tocopheryl acetate, 11 IU; menadione sodium bisulfite, 3.5; choline chloride, 220; thiamin mononitrate, 2.42; riboflavin, 4.4; pantothenic acid, 8.8; nicotinic acid, 44; pyridoxine, 2.2; folic acid, 55; ethoxyquin, 125.4.
[2]Trace mineral mix provides (milligrams/kilogram diet): manganese ($MnO_2$), 60; zinc (ZnO), 50; iron ($FeSO_4 \cdot 7H_2O$), 25; copper (CuO), 5; iodine [$Ca(IO_3)_2$], 1.1.
[3]Provides 0.1 mg selenium/kg diet as sodium selenite.
[4]Monensin sodium (120 mg/kg diet), Elanco Products Company, Indianapolis, IN.
[5]Bacitracin methylene dialicylate (55 mg/kg diet), A.L. Laboratories, Inc., Englewood Cliffs, N.J.

Table 2 demonstrates that reducing the dietary protein level from 21 to 18% did not significantly affect body weight gain, food intake, food efficiency, or abdominal fat deposition. The only significant effect of adding GLU or GLY to the low protein diet was reduced abdominal fat deposition caused by GLU addition. Glyoxylic acid and GA supplementation signifi- Example 2

The influence of graded dietary levels of GA (0, 0.5, 1, 2 and 3% of the diet) upon 21–42 d female and male broiler body weight gain, food intake and efficiency and abdominal fat deposition was determined. The composition of the diets fed is shown in Table 3. All conditions were identical to Example 1 except that the dietary source of GA in this example was provided by a GA (free acid)-water mixture (70% GA).

TABLE 3

Composition of the diets fed in Example 2 (g/kg)

| | Control | .5% glycolic acid | 1% glycolic acid | 2% glycolic acid | 3% glycolic acid |
|---|---|---|---|---|---|
| Ground yellow corn USA | 637.9 | 627.0 | 616.2 | 594.6 | 573.2 |
| Soybean oil meal USA (dehulled) | 295.9 | 297.9 | 299.8 | 303.7 | 303.6 |
| Poultry fat (stabilized) | 28.6 | 32.4 | 36.2 | 43.9 | 51.5 |
| L-glutamic acid | — | — | — | — | — |
| Glycine | — | — | — | — | — |
| Glycolic acid | — | 5.0 | 10.0 | 20.0 | 30.0 |
| Dicalcium phosphate (feed grade) | 14.7 | 14.8 | 14.8 | 14.9 | 14.9 |

TABLE 3-continued

| | Composition of the diets fed in Example 2 (g/kg) | | | | |
|---|---|---|---|---|---|
| | Control | .5% glycolic acid | 1% glycolic acid | 2% glycolic acid | 3% glycolic acid |
| Ground limestone | 13.1 | 13.1 | 13.1 | 13.0 | 12.9 |
| Iodized sodium chloride | 4.3 | 4.3 | 4.3 | 4.3 | 4.3 |
| Vitamin premix[1] | 2.5 | 2.5 | 2.5 | 2.5 | 2.5 |
| DL-methionine | 0.3 | 0.3 | 0.4 | 0.4 | 0.4 |
| Trace mineral premix[2] | 0.5 | 0.5 | 0.5 | 0.5 | 0.5 |
| Selenium premix[3] | 0.5 | 0.5 | 0.5 | 0.5 | 0.5 |
| L-lysine.HCL | — | — | — | — | — |
| Coban-45[4] | 1.2 | 1.2 | 1.2 | 1.2 | 1.2 |
| BMD-50[5] | 0.5 | 0.5 | 0.5 | 0.5 | 0.5 |
| Calculated content Metabolizable energy (kcal/kg) | 3100 | 3100 | 3100 | 3100 | 3100 |
| Crude protein (g/kg) | 200 | 200 | 200 | 200 | 200 |

[1]Vitamin premix supplies (milligrams/kilogram diet, except as noted): all-trans-retinyl acetate, 5500 IU; cholecalciferol 880 ICU; all-rac-α-tocopheryl acetate, 11 IU; menadione sodium bisulfite, 3.5; choline chloride, 220; thiamin mononitrate, 2.42; riboflavin, 4.4; pantothenic acid, 8.8; nicotinic acid, 44; pyridoxine, 2.2; folic acid, 55; ethoxyquin, 125.4.
[2]Trace mineral mix provides (milligrams/kilogram diet): manganese ($MnO_2$), 60; zinc (ZnO), 50; iron ($FeSO_4 \cdot 7H_2O$), 25; copper (CuO), 5; iodine [$Ca(IO_3)_2$], 1.1.
[3]Provides 0.1 mg selenium/kg diet as sodium selenite.
[4]Monensin sodium (120 mg/kg diet), Elanco Products Company, Indianapolis, IN.
[5]Bacitracin methylene dialicylate (55 mg/kg diet), A.L. Laboratories, Inc., Englewood Cliffs, N.J.

TABLE 4

| Effect of dietary glycolic acid supplementation upon 21-42 d broiler performance (Example 2) | | | | | |
|---|---|---|---|---|---|
| | Diet | | | | |
| Response criteria | Control | 0.5% Glycolic acid | 1% Glycolic acid | 2% Glycolic acid | 3% Glycolic acid |
| 42 d Weight (g/chick) | | | | | |
| Female | 1630 ± 43 | 1599 ± 27 | 1497 ± 15 | 1447 ± 10 | 1109 ± 46 |
| Male | 1843 ± 37 | 1865 ± 22 | 1810 ± 34 | 1577 ± 37 | 1236 ± 44 |
| 21-42 d Weight gain (g/chick) | | | | | |
| Female | 1041 ± 36 | 991 ± 28 | 920 ± 14 | 842 ± 14 | 521 ± 41 |
| Male | 1187 ± 32 | 1162 ± 32 | 1114 ± 53 | 883 ± 57 | 566 ± 58 |
| 21-42 d Food intake (g/chick) | | | | | |
| Female | 2270 ± 55 | 2197 ± 53 | 2023 ± 23 | 1902 ± 18 | 1430 ± 56 |
| Male | 2579 ± 64 | 2636 ± 37 | 2476 ± 30 | 2069 ± 46 | 1722 ± 117 |
| 21-42 d Feed efficiency (gain:feed) | | | | | |
| Female | .458 ± .005 | .451 ± .013 | .455 ± .005 | .443 ± .011 | .363 ± .016 |
| Male | .460 ± .004 | .441 ± .010 | .449 ± .018 | .426 ± .019 | .333 ± .037 |
| 42 d Abdominal fat deposition (% whole carcass) | | | | | |
| Female | 1.75 ± .13 | 1.78 ± .10 | 1.52 ± .07 | 1.46 ± .17 | 1.15 ± .12 |
| Male | 1.40 ± .11 | 1.34 ± .07 | 1.20 ± .05 | 1.28 ± .15 | .78 ± .07 |
| 21-42 d Mortality (deaths/number chicks started) | | | | | |
| Female | 0/40 | 1/40 | 0/40 | 1/40 | 1/40 |
| Male | 1/40 | 3/40 | 2/40 | 3/40 | 1/40 |

Figure 1:
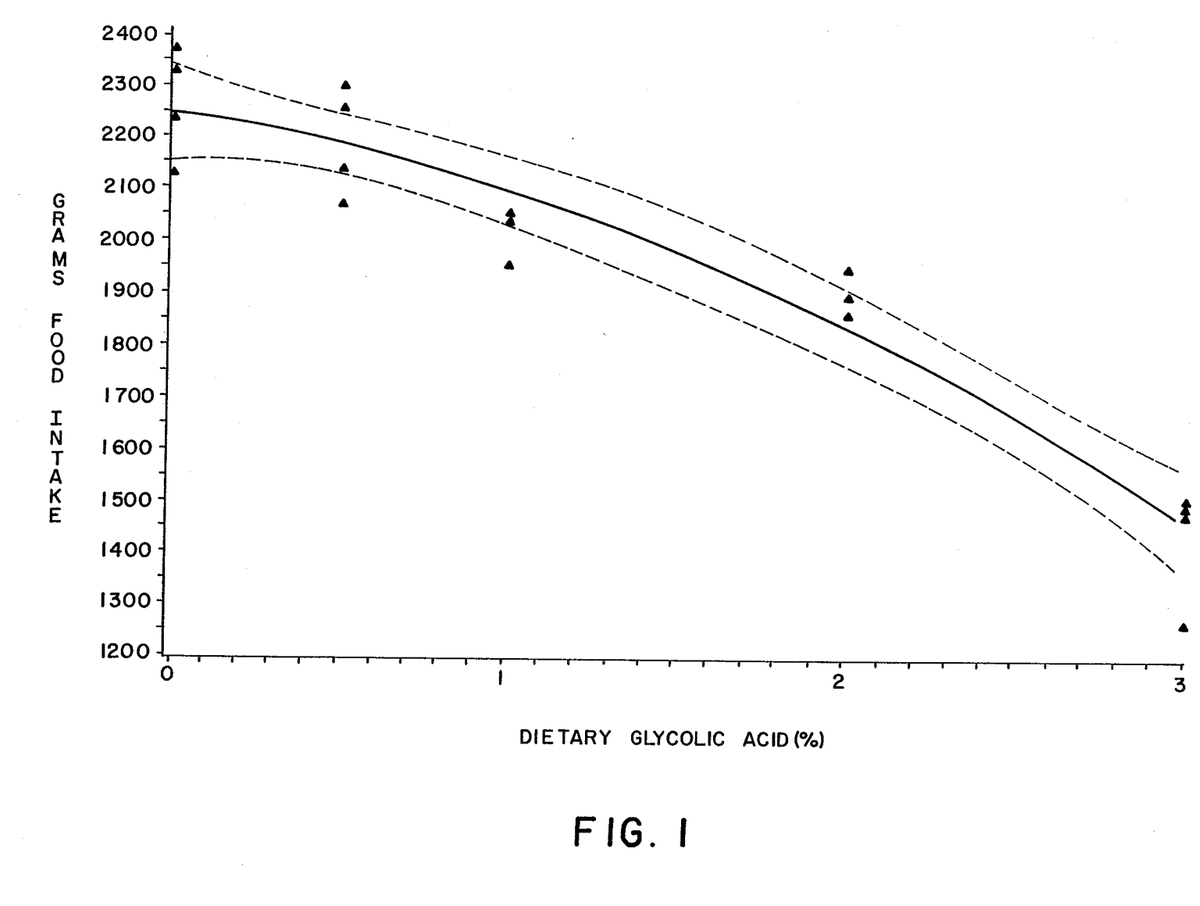
FIG. 1 is a graphic representation of the influence of dietary glycolic acid (GA) level on 21-42 day food intake of female broiler chickens.
Figure 2:
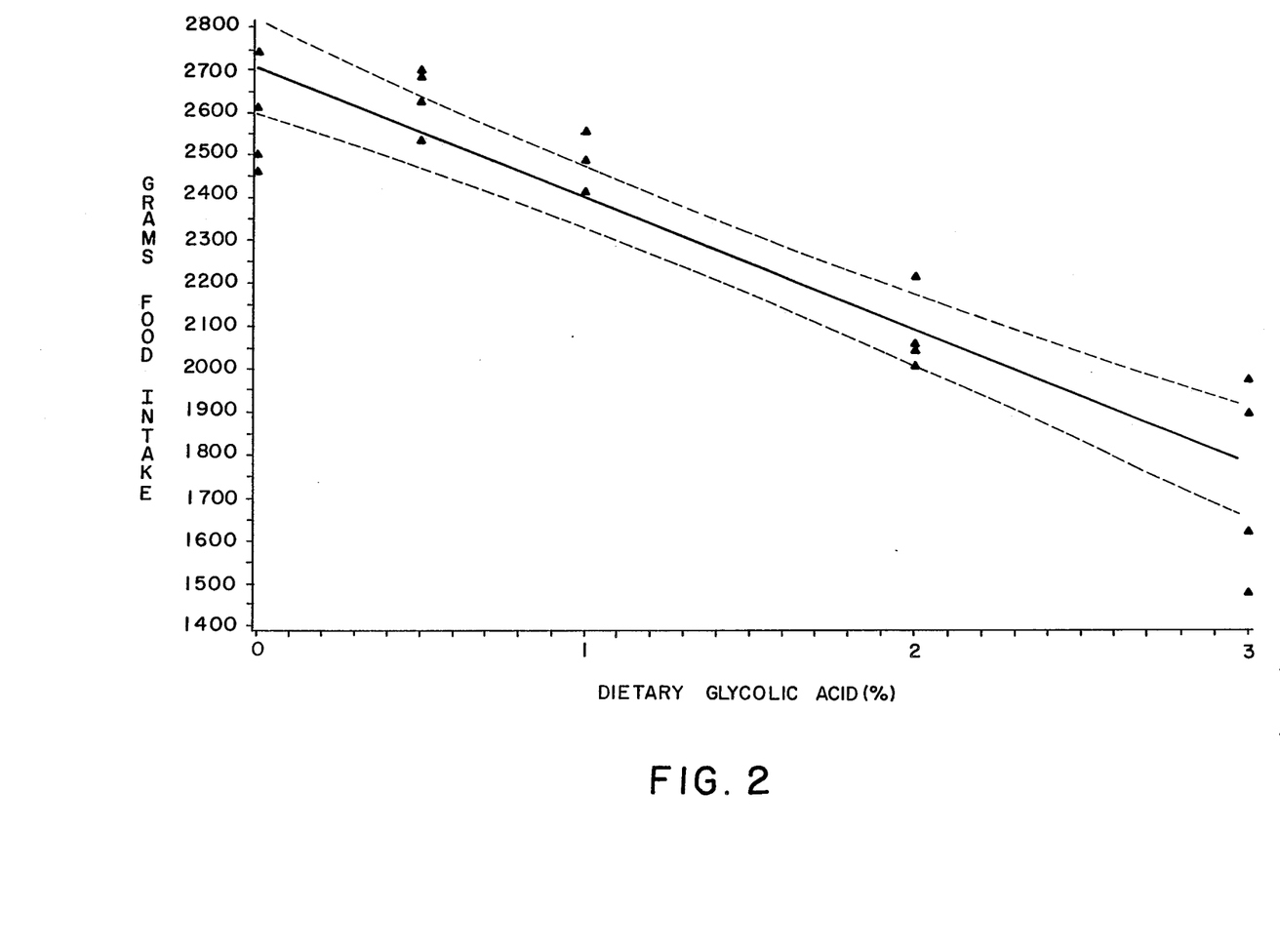
FIG. 2 is a graphic representation of the influence of dietary GA level on 21-42 day food intake of male broiler chickens.

Table 4 demonstrates that food intake of male and female broilers from 21–42 d was affected in a dose-dependent manner by GA supplementation. In other words, feed intake reduction increased as the amount of GA increased. Graphical ilustrations of the relationships between dietary GA content and female and male food intake appear in FIGS. 1 and 2, respectively. In FIG. 1, the prediction equation for the quadratic model (solid line) was: 21–42 d food intake (g/chick) = 2250.20007 − 95.76581 × GA (% of diet) − 56.66240 × $GA^2$ ($r^2 = 0.9128$). In FIG. 2, the prediction equation for the linear model (solid line) was: 21–42 d food intake (g/chick) = 2706.33734 − 315.27766 × GA % of diet) ($r^2 = 0.8536$). In both figures, the dashed lines on each side of the solid line represent 95% confidence limits on the regression model. Also, actual observations are indicated by the triangles.

Example 3

The effects of graded dietary levels of GA (0, 1, 2 and 3% of the diet) upon 0–14 and 21 d body weight gain, food intake and feed efficiency and carcass composition were determined. Only female chicks were used. The composition of the diets fed is shown in Table 5. The chemical form of GA was a crystalline free acid (95% GA). At 14 d, half of the replicates representing those fed 1, 2 and 3% GA were fed the control diet for the 14–21 d period. The chicks were reared in electrically heated battery brooders with wire mesh floors (each unit was 91 cm wide, 33 cm deep and 23 cm high). Each battery unit was equipped with one feed tray and one water tray. The battery brooders and room were lighted 24 hours a day. All chicks were fed and watered ad libitum for the duration of the experiment. Newly hatched chicks were randomly distributed into groups of eight, weighed by group and assigned to battery units, four groups per diet. Otherwise, the conditions were identical to those described in Example 1.

TABLE 5

Composition of the diets fed in Example 3 (g/kg)

| | Control | 1% glycolic acid | 1.5% glycolic acid | 2% glycolic acid | 3% glycolic acid |
|---|---|---|---|---|---|
| Ground yellow corn USA | 565.7 | 542.8 | 507.1 | 520.0 | 497.0 |
| Soybean oil meal USA (dehulled) | 351.9 | 356.9 | 380.1 | 361.9 | 366.9 |
| Poultry fat (stabilized) | 41.3 | 49.2 | 56.8 | 57.0 | 64.9 |
| L-glutamic acid | — | — | — | — | — |
| Glycine | — | — | — | — | — |
| Glyoclic acid | — | 10.0 | 15.0 | 20.0 | 30.0 |
| Dicalcium phosphate (feed grade) | 17.2 | 17.2 | 17.1 | 17.3 | 17.3 |
| Ground limestone | 14.0 | 14.0 | 13.9 | 13.9 | 13.9 |
| Iodized sodium chloride | 4.3 | 4.3 | 4.3 | 4.3 | 4.3 |
| Vitamin premix[1] | 2.5 | 2.5 | 2.5 | 2.5 | 2.5 |
| DL-methionine | 1.6 | 1.6 | 1.7 | 1.6 | 1.7 |
| Trace mineral premix[2] | 0.5 | 0.5 | 0.5 | 0.5 | 0.5 |
| Selenium premix[3] | 0.5 | 0.5 | 0.5 | 0.5 | 0.5 |
| L-lysine.HCL | — | — | — | — | — |
| Coban-45[4] | — | — | — | — | — |
| BMD-50[5] | 0.5 | 0.5 | 0.5 | 0.5 | 0.5 |
| Calculated content Metabolizable energy (kcal/kg) | 3100 | 3100 | 3100 | 3100 | 3100 |
| Crude protein (g/kg) | 230 | 230 | 230 | 230 | 230 |

[1]Vitamin premix supplies (milligrams/kilogram diet, except as noted): all-trans-retinyl acetate, 5500 IU; cholecalciferol 880 ICU; all-rac-α-tocopheryl acetate, 11 IU; menadione sodium bisulfite, 3.5; choline chloride, 220; thiamin mononitrate, 2.42; riboflavin, 4.4; pantothenic acid, 8.8; nicotinic acid, 44; pyridoxine, 2.2; folic acid, 55; ethoxyquin, 125.4.
[2]Trace mineral mix provides (milligrams/kilogram diet): manganese ($MnO_2$), 60; zinc (ZnO), 50; iron ($FeSO_4 \cdot 7H_2O$), 25; copper (CuO), 5; iodine [$Ca(IO_3)_2$], 1.1.
[3]Provides 0.1 mg selenium/kg diet as sodium selenite.
[4]Monensin sodium (120 mg/kg diet), Elanco Products Company, Indianapolis, IN.
[5]Bacitracin methylene dialicylate (55 mg/kg diet), A.L. Laboratories, Inc., Englewood Cliffs, N.J.

TABLE 6

Effect of dietary glycolic acid supplementation upon 0-14 and 14-21 d female broiler performance (Example 3)

| Diet | 14 d Weight g/chick | 0-14 d Weight gain g/chick | 0-14 d Food intake g/chick | 0-14 d Feed efficiency feed:gain | 21 d Weight g/chick | 14-21 d Weight gain g/chick | 14-21 d Food intake g/chick | 14-21 d Feed efficiency gain:feed |
|---|---|---|---|---|---|---|---|---|
| Control | 337 ± 10 | 294 ± 10 | 393 ± 8 | .747 ± .016 | 613 ± 10 | 276 ± 8 | 452 ± 19 | .617 ± .037 |
| 1% Glycolic acid (0-21 d) | 328 ± 4 | 284 ± 4 | 371 ± 4 | .766 ± .004 | 592 ± 8 | 262 ± 4 | 397 ± 2 | .660 ± .010 |
| 1% Glycolic acid (0-14 d), control (14-21 d) | — | — | — | — | 606 ± 6 | 281 ± 4 | 420 ± 3 | .668 ± .008 |
| 2% Glycolic acid (0-21 d) | 298 ± 3 | 256 ± 3 | 337 ± 3 | .758 ± .005 | 557 ± 13 | 247 ± 21 | 370 ± 15 | .662 ± .033 |
| 2% Glycolic acid (0-14 d), control (14-21 d) | — | — | — | — | 583 ± 13 | 287 ± 12 | 416 ± 12 | .688 ± .010 |
| 3% Glycolic acid (0-21 d) | 256 ± 6 | 213 ± 6 | 290 ± 7 | .736 ± .009 | 438 ± 6 | 162 ± 13 | 275 ± 16 | .587 ± .015 |
| 3% Glycolic acid (0-14 d), control (14-21 d) | — | — | — | — | 504 ± 33 | 250 ± 22 | 378 ± 15 | .657 ± .040 |

TABLE 7

Effect of dietary glycolic acid supplementation upon 0-21 d female broiler performance (Example 3)

| Diet | 0-21 d Weight gain g/chick | 0-21 d Food intake g/chick | 0-21 d Feed efficiency gain:feed | 0-21 d Mortality deaths/number started | 21 d Carcass moisture % whole carcass | 21 d Carcass protein % whole carcass | 21 d Carcass total lipids % whole carcass |
|---|---|---|---|---|---|---|---|
| Control | 570 ± 10 | 845 ± 22 | .677 ± .024 | 0/32 | 69.40 ± .23 | 17.22 ± .27 | 11.56 ± .44 |
| 1% Glycolic acid (0-21 d) | 550 ± 8 | 770 ± 7 | .714 ± .007 | 0/32 | 69.07 ± .45 | 17.67 ± .20 | 11.02 ± .52 |
| 1% Glycolic acid (0-14 d), Control (14-21 d) | 561 ± 6 | 789 ± 5 | .711 ± .006 | 1/32 | 69.55 ± .24 | 17.38 ± .15 | 10.25 ± .20 |
| 2% Glycolic acid (0-21 d) | 503 ± 23 | 709 ± 15 | .709 ± .019 | 1/32 | 70.12 ± .40 | 17.25 ± .25 | 10.74 ± .62 |
| 2% Glycolic acid (0-14 d), Control (14-21 d) | 541 ± 13 | 752 ± 14 | .720 ± .004 | 0/32 | 70.02 ± .35 | 17.08 ± .04 | 10.80 ± .26 |
| 3% Glycolic acid (0-21 d) | 376 ± 12 | 569 ± 14 | .661 ± .011 | 3/32 | 71.66 ± .56 | 17.64 ± .13 | 8.66 ± .57 |
| 3% Glycolic acid (0-14 d), Control (14-21 d) | 462 ± 32 | 664 ± 25 | .694 ± .028 | 0/32 | 70.11 ± .73 | 17.81 ± .74 | 9.55 ± .42 |

Figure 3:
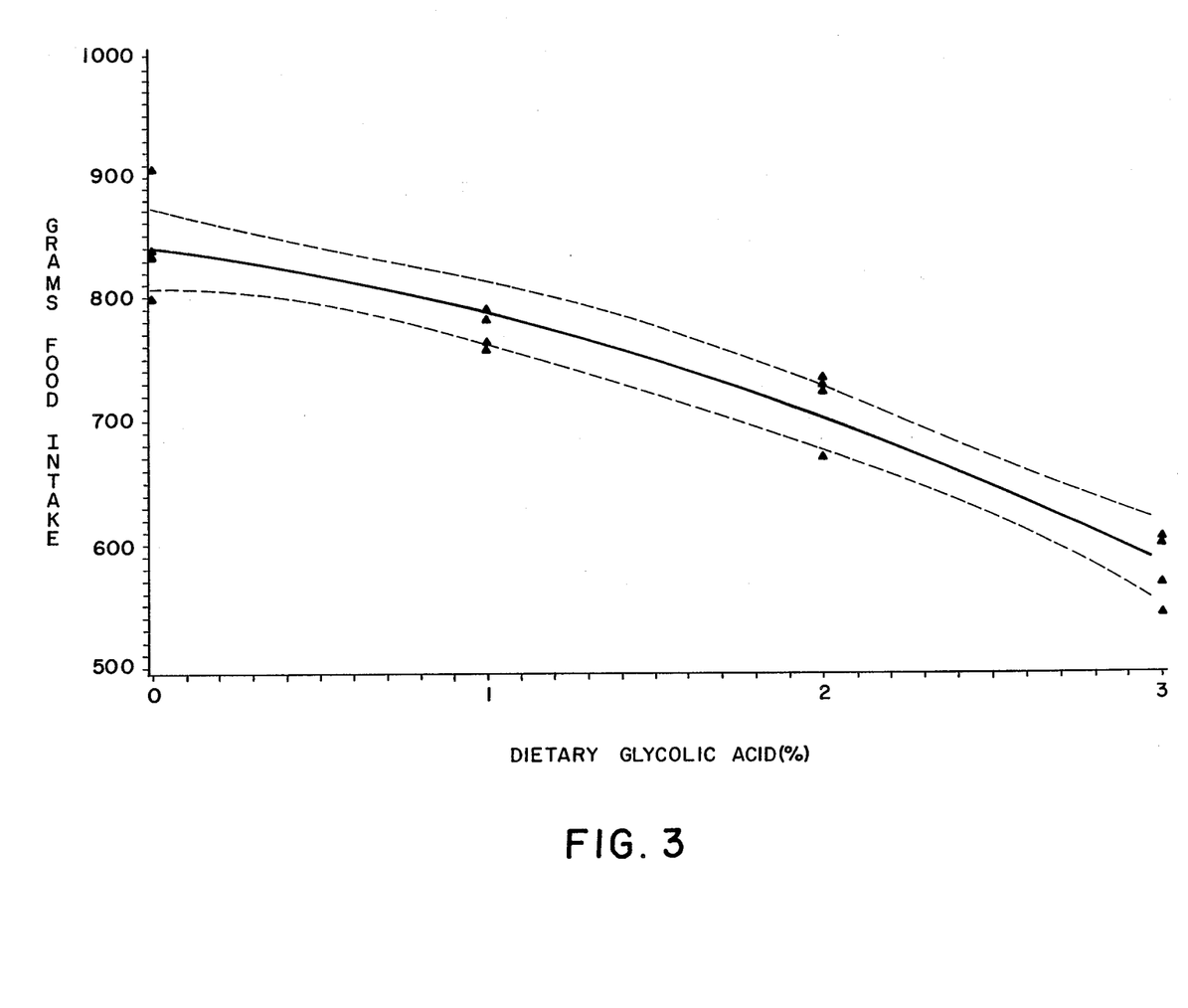
FIG. 3 is a graphic representation of the influence of dietary GA level on 0-21 day food intake of female broiler chickens.

Tables 6 and 7 illustrate the effects of feeding graded levels of GA on feed intake and performance of newly hatched chicks for 14 or 21 d and on recovery after withdrawal of GA for 7 days. Food intake during the 0-14 d decreased in a significant quadratic fashion with increasing dietary GA levels while the decreases were of a significant linear and quadratic manner for both the 14-21 and 0-21 d, respectively. A graphical illustration of the relationship between dietary GA content and overall 0-21 d food intake is presented in FIG. 3. In FIG. 3, the prediction equation for the quadratic model (solid line) was: 0-21 d food intake (g/chick = $840.31897 - 40.17880 \times GA$ (% of diet) $- 16.25335 \times GA^2$ ($r^2 = 0.9246$). The dashed lines on each side of the solid line represents 95% confidence limits on the regression model. Actual observations are indicated by triangles.

These data suggest that there are deleterious residual effects associated with prior GA ingestion upon food intake, body weight gain and feed efficiency. In fact, in some cases, chicks previously fed a GA supplemented diet showed increased food intake and improved weight gain upon return to the control diet as compared to chicks fed only the control diet. For example, compared to their supplemented counterparts, 14-21 and overall 0-21 d food intake were both significantly increased when chicks previously fed the diet containing 3% GA, but not 1 or 2%, were changed to the control die for the last 7 days. Body weight gain and feed efficiency during the 0-14, 14-21 and 0-21 d were reduced in a significant quadratic manner with increasing dietary levels of GA. In addition, switching half of the replicates fed GA-containing diets to the control diet for the 14-21 d resulted in significantly improved body weight gain for the 14-21 d when chicks were previously fed diets containing 2 or 3% GA, but not 1%. However, no significant changes in feed efficiency occurred. Further, for the 0-21 d, switching chicks previously fed a diet containing 3% GA, but not 1 or 2%, back to the control diet for the last 7 days resulted in significantly improved overall body weight gain compared to the supplemented counterpart, but overall feed efficiency was not significantly altered.

Example 4

The comparative effects of feeding graded dietary levels of GA (0, 1.5 and 3% of the diet) and equimolar levels of acetic acid upon 1-14 d male broiler growth, food intake and efficiency were determined. The acetic acid utilized was reagent grade glacial acetic acid (99.8% glacial acetic acid). The composition of the diets fed is shown in Table 8. The conditions were identical to those set forth in Example 3 except that male chicks were used, the newly hatched chicks were ranodmly distributed into groups of ten and at 14 d and all chicks were weighed by pen.

TABLE 8

Composition of the diets fed in Example 4 (g/kg)

|  | Control | 1.5% glycolic acid | 3% glycolic acid | 1.7% acetic acid | 3.4% acetic acid |
| --- | --- | --- | --- | --- | --- |
| Ground yellow corn USA | 565.7 | 507.1 | 497.0 | 507.1 | 497.0 |
| Soybean oil meal USA (dehulled) | 351.9 | 380.1 | 366.9 | 380.1 | 366.9 |
| Poultry fat (stabilized) | 41.3 | 56.8 | 64.9 | 56.8 | 64.9 |
| L-glutamic acid | — | — | — | — | — |
| Glycine | — | — | — | — | — |
| Glycolic acid | — | 15.0 | 30.0 | — | — |
| Acetic acid | — | — | — | 17.0 | 34.0 |
| Dicalcium phosphate (feed grade) | 17.2 | 17.1 | 17.3 | 17.1 | 17.3 |
| Ground limestone | 14.0 | 13.9 | 13.9 | 13.9 | 13.9 |
| Iodized sodium chloride | 4.3 | 4.3 | 4.3 | 4.3 | 4.3 |
| Vitamin premix[1] | 2.5 | 2.5 | 2.5 | 2.5 | 2.5 |
| DL-methionine | 1.6 | 1.7 | 1.7 | 1.7 | 1.7 |
| Trace mineral premix[2] | 0.5 | 0.5 | 0.5 | 0.5 | 0.5 |
| Selenium premix[3] | 0.5 | 0.5 | 0.5 | 0.5 | 0.5 |
| L-lysine.HCL | — | — | — | — | — |
| Coban-45[4] | — | — | — | — | — |
| BMD-50[5] | 0.5 | 0.5 | 0.5 | 0.5 | 0.5 |
| Calculated content Metabolizable energy (kcal/kg) | 3100 | 3100 | 3100 | 3100 | 3100 |
| Crude protein (g/kg) | 230 | 230 | 230 | 230 | 230 |

[1]Vitamin premix supplies (milligrams/kilogram diet, except as noted): all-trans-retinyl acetate, 5500 IU; cholecalciferol 880 ICU; all-rac-α-tocopheryl acetate 11 IU; menadione sodium bisulfite, 3.5; choline chloride, 220; thiamin mononitrate, 2.42; riboflavin, 4.4; pantothenic acid, 8.8; nicotinic acid, 44; pyridoxine, 2.2; folic acid, 55; ethoxyquin, 125.4.
[2]Trace mineral mix provides (milligrams/kilogram diet): manganese ($MnO_2$), 60; zinc (ZnO), 50; iron ($FeSO_4 \cdot 7H_2O$), 25; copper (CuO), 5; iodine ($Ca(IO_3)_2$), 1.1.
[3]Provides 0.1 mg selenium/kg diet as sodium selenite.
[4]Monensin sodium (120 mg/kg diet), Elanco Products Company, Indianapolis, IN.
[5]Bacitracin methylene dialicylate (55 mg/kg diet), A.L. Laboratories, Inc., Englewood Cliffs, N.J.

TABLE 9

Effect of dietary acetic and glycolic acids on 0-14 d male broiler performance (Example 4)

| Diet | 14 d Weight g/chick | 0-14 d Weight gain g/chick | 0-14 d Food intake g/chick | 0-14 d Feed efficiency gain:feed | 0-14 d Mortality deaths/number started |
| --- | --- | --- | --- | --- | --- |
| Control | 306 ± 4 | 260 ± 4 | 511 ± 4 | .509 ± .005 | 0/40 |
| 1.5% Glycolic acid | 292 ± 7 | 245 ± 6 | 471 ± 5 | .520 ± .011 | 0/40 |
| 3.0% Glycolic acid | 229 ± 9 | 182 ± 10 | 419 ± 10 | .431 ± .03 | 1/40 |
| 1.7% Acetic acid | 310 ± 12 | 264 ± 12 | 501 ± 9 | .525 ± .015 | 0/40 |
| 3.4% Acetic acid | 325 ± 8 | 280 ± 8 | 517 ± 10 | .541 ± .008 | 0/40 |

Table 9 demonstrates that a significant linear decrease in food intake occurred as the level of GA supplementation was increased. However, food intake was not significantly influenced by acetic acid supplementation. Irrespective of the level of dietary supplementation, chicks fed GA-containing diets consumed significantly less food than those fed diets supplemented with acetic acid.

The results of the aforementioned examples demonstrate that GA reduces food intake of broiler chicks in a marked dose-dependent manner. At the highest level of supplementation of GA (3% of the diet) the presence of GA reduced food intake of female chicks 0-14 d by 26%, 0-21 d by 33% and 21-42 d by 37% and of males 0-14 d by 18% and 21-42 d by 33% as compared to feed intake of the control. The reduction in food intake observed in 0-14 d males and 0-14 or 21 d females fed 1-1.5% GA-containing diets caused only slight reductions of body weight but improved feed efficiency. Acetic acid supplementation (1.5 or 3% of the diet) had no effect upon food intake. In addition, no outward manifestations of toxicity were observed at the levels of GA used.

Accordingly, it is apparent from the examples set forth above that glycolic acid is more effective in reducing voluntary feed intake of broiler chicks than prior feed additives, including acetic acid.

What is claimed is:

1. A method for controlling food intake in poultry which comprises feeding to the poultry a feed composition containing a feed material and glycolic acid in an amount effective to reduce the intake of the feed material by the poultry.

2. The method as claimed in claim 1 wherein the poultry are chickens.

3. The method as claimed in claim 1 wherein the feed composition contains glycolic acid in an amount of about 0.5% to 5% by weight of the feed composition.

4. The method as claimed in claim 3 wherein the feed composition contains glycolic acid in an amount of about 2% to 3% by weight of the feed composition.

5. The method as claimed in claim 4 wherein the feed composition contains glycolic acid in an amount of about 2.77% by weight of the feed composition.

6. A poultry feed composition which comprises a feed material and glycolic acid in an amount effective to reduce intake of the feed material by the poultry.

7. The poultry feed composition as claimed in claim 6 wherein the poultry are chickens.

8. The poultry feed composition of claim 6 wherein the feed composition contains glycolic acid in an amount of about 0.5% to 5% by weight of the feed composition.

9. The poultry feed composition of claim 8 wherein the feed composition contains glycolic acid in an amount of about 2% to 3% by weight of the feed composition.

10. The poultry feed composition as claimed in claim 9 wherein the feed composition contains glycolic acid in an amount of about 2.77% by weight of the feed composition.

* * * * *

UNITED STATES PATENT AND TRADEMARK OFFICE
CERTIFICATE OF CORRECTION

PATENT NO. : 4,818,543

DATED : April 4, 1989

INVENTOR(S) : Leo S. Jensen and Brian I. Fancher

It is certified that error appears in the above-identified patent and that said Letters Patent is hereby corrected as shown below:

Tables 1,3,5 and 8, far most left column, change the sixth item in the column from "Glyoclic" to -- Glycolic --.

Table 1, delete the numerical entries "3200 3200 3200 3200 3200 3200" following the eighteenth listing "Calculated content", indent the nineteenth listing "Metabolizable energy (kcal/kg)" and insert thereafter --3200 3200 3200 3200 3200 3200--;

Tables 3 and 5, delete the numerical entries "3100 3100 3100 3100 3100" following the seventeenth listing "Calculated content", indent the eighteenth listing "Metabolizable energy (kcal/kg)" and insert thereafter --3100 3100 3100 3100 3100--;

Table 8, delete the numerical entries "3100 3100 3100 3100 3100" following the eighteenth entry "Calculated content", indent the nineteenth listing "Metabolizable energy (kcal/kg)" and insert thereafter --3100 3100 3100 3100 3100--;

Tables 1 and 8, far most left column, change the fifteenth listing from "L-lysine.HCL" to --L-lysine·HCL--;

Tables 3 and 5, far most left column, change the fourteenth listing from "L-lysine.HCL" to --L-lysine·HCL--;

Tables 1,3,5 and 8, line 1 of footnote 1, change "all-trans-retinyl acetate" to --all-_trans_-retinyl acetate-- and in line 2 of footnote 1, change all-rac-α-tocopheryl acetate" to --all-_rac-α_-tocopheryl acetate--; and Tables 1,3,5 and 8, in lines 1 and 2 of footnote 2, change "(FeSO$_4$.7H$_2$O)" to --(FeSO$_4$·7H$_2$O)--.

Signed and Sealed this

Twenty-first Day of November, 1989

Attest:

JEFFREY M. SAMUELS

Attesting Officer

Acting Commissioner of Patents and Trademarks